(12) United States Patent
Rothschild

(10) Patent No.: US 8,645,211 B2
(45) Date of Patent: Feb. 4, 2014

(54) SYSTEM AND METHOD FOR ADDING AN ADVERTISEMENT TO A PERSONAL COMMUNICATION

(76) Inventor: Anthony R. Rothschild, London (GB)

(*) Notice: Subject to any disclaimer, the term of this patent is extended or adjusted under 35 U.S.C. 154(b) by 2460 days.

(21) Appl. No.: 09/755,541

(22) Filed: Jan. 5, 2001

(65) Prior Publication Data
US 2001/0047294 A1 Nov. 29, 2001

Related U.S. Application Data

(60) Provisional application No. 60/174,781, filed on Jan. 6, 2000.

(51) Int. Cl.
*G06Q 30/00* (2012.01)

(52) U.S. Cl.
USPC ............. 705/14.55; 705/14.73; 705/14.1

(58) Field of Classification Search
USPC .................. 705/14.55, 14.73, 14.1
See application file for complete search history.

(56) References Cited

U.S. PATENT DOCUMENTS

| | | | | |
|---|---|---|---|---|
| 5,855,008 A | * | 12/1998 | Goldhaber et al. | 705/14 |
| 6,012,098 A | * | 1/2000 | Bayeh et al. | 709/246 |
| 6,029,141 A | * | 2/2000 | Bezos et al. | 705/27.1 |
| 6,205,432 B1 | * | 3/2001 | Gabbard et al. | 705/14 |
| 6,285,987 B1 | * | 9/2001 | Roth et al. | 705/27 |
| 6,317,789 B1 | * | 11/2001 | Rakavy et al. | 709/224 |
| 6,449,657 B2 | * | 9/2002 | Stanbach et al. | 709/245 |
| 6,523,008 B1 | * | 2/2003 | Avrunin et al. | 704/273 |
| 6,622,174 B1 | * | 9/2003 | Ukita et al. | 709/246 |
| 6,684,257 B1 | * | 1/2004 | Camut et al. | 709/246 |
| 6,698,020 B1 | * | 2/2004 | Zigmond et al. | 725/34 |
| 2005/0119936 A1 | | 6/2005 | Buchanan et al. | |
| 2007/0233556 A1 | | 10/2007 | Koningstein | |
| 2007/0244750 A1 | | 10/2007 | Grannan et al. | |

FOREIGN PATENT DOCUMENTS

| | | | | |
|---|---|---|---|---|
| KR | 99073076 A | * | 10/1999 | G06F 17/60 |
| WO | WO 96/24213 | | 8/1996 | |
| WO | WO 99/63453 | | 12/1999 | |
| WO | WO 00/58882 | | 10/2000 | |

OTHER PUBLICATIONS

"Hakuhodo e-mail service offers New Year prizes", Sep. 30, 1996, Advertising Age, v 67, n 40, p. 48.*
Andrews, Whit, "Panning for Gold in Technology Stocks," Omaha World-Herald, Jan. 25, 1998, p. 55.R.*
Jurvetson et al, "Viral Marketing", published in the Netscape M-Files, 1997, published in Business 2.0, Nov. 1998.*

(Continued)

*Primary Examiner* — Michael Bekerman
(74) *Attorney, Agent, or Firm* — O'Melveny & Myers LLP

(57) ABSTRACT

A system and method is provided for adding an advertisement to a personal communication and providing additional communication data to a recipient that interacts with the advertisement regardless of the network device the recipient is utilizing. A sender network device communicates with an advertising application operating on a Web site to generate a personal communication containing at least one advertisement. In one embodiment of the present invention, the advertising application is configured to select an advertisement based on at least a portion of the content of the personal communication. If the advertisement is interactive, and the advertisement is interacted with, the advertising application will provide the recipient with additional communication data in a format that can be understood by the recipient network device.

19 Claims, 9 Drawing Sheets

(56) References Cited

OTHER PUBLICATIONS

"ISPS Offers Way to Check Email", Interactive Daily, Mar. 14, 1997, ISSN: 1083:141X.*

AF By Marc Langheinrich, Atsuyoshi Nakamura, Naoki Abe, Tomonari Kamba, and Yoshiyuki Koseki, "Unintrusive Customization Techniques for Web Advertising" May 17, 1999, Computer Networks, vol. 31, No. 11-16, pp. 1259-1272.

* cited by examiner

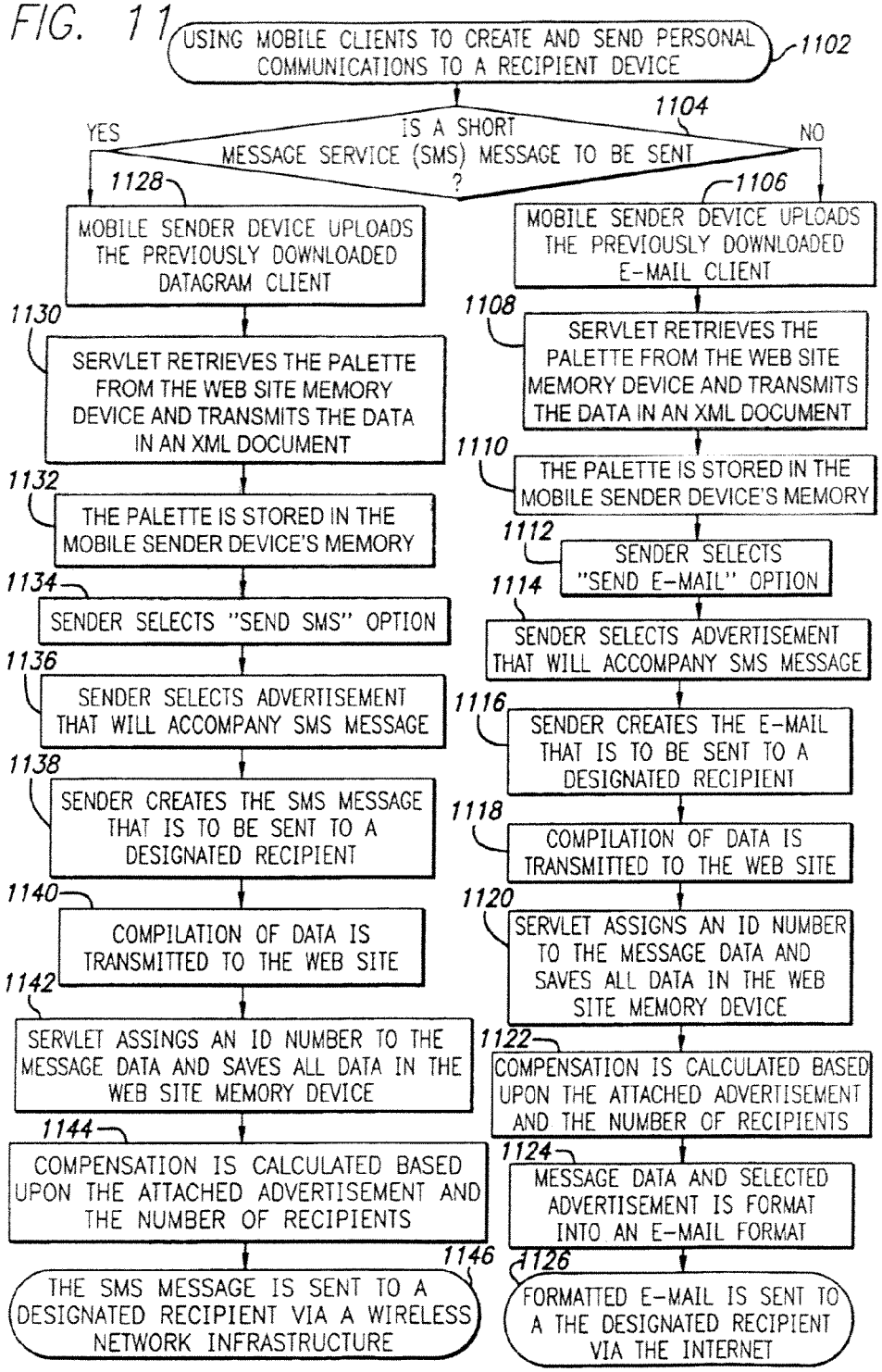

SYSTEM AND METHOD FOR ADDING AN ADVERTISEMENT TO A PERSONAL COMMUNICATION

CROSS-REFERENCE TO RELATED APPLICATION

This application claims the benefit pursuant to 35 U.S.C. §119(e) of U.S. Provisional Application No. 60/174,781, filed Jan. 6, 2000, which application is specifically incorporated herein, in its entirety, by reference.

COPYRIGHT NOTICE

This patent document contains material subject to copyright protection. The copyright owner, Anthony Rothschild, has no objection to the reproduction of this patent document or any related materials, as they appear in the files of the Patent and Trademark Office of the United States or any other country, but otherwise reserves all rights whatsoever.

BACKGROUND OF THE INVENTION

1. Field of the Invention

The present invention relates to advertising over a wide area network such as the Internet, and more particularly, to a system and method that allows an Internet user to place an advertisement within a personal communication, and provides a recipient of the personal communication requesting additional information with such information regardless of the network device the recipient is using.

2. Description of Related Art

The number of Internet users has been growing at an ever increasing rate over the past seven years. By the end of 2000 there will be more than 400 million individuals worldwide that have access to the Internet, where 153 million of those individuals reside in the United States. Businesses are aware of this growing audience and have responded by spending $3.1 billion for Internet advertising in 1999. Although advertising through the Internet has indirect benefits, like reinforcing brand name recognition, the direct benefits of Internet advertising can be seen through e-commerce transactions, which generated over $132 billion worldwide in 2000.

The rapid increase in the number of individuals who have Internet access has lead to, and may in part be attributed to, an increase in e-mail usage. With respect to the 153 million U.S. individuals that have access to the Internet, 97 million of them are over the age of 14 and have active e-mail accounts. Studies have shown that 90% of those e-mail users connect to the Internet primarily to view and send e-mail. Additionally, 40% of those individuals stated that checking their e-mail was one of the first things they do in the morning, as well as one of the last things they do before going to bed. As these numbers suggest, the e-mail users, which worldwide are responsible for generating 10 billion e-mail messages daily, are spending a great deal of time interacting with a medium that is relatively untapped by the advertising industry. In an effort to penetrate this medium, businesses spent over $1.1 billion on e-mail marketing in 2000. The preliminary success of such marketing has led firms like eMarketer™ to predict that funds allocated to e-mail marketing will rise to $4.5 billion by 2003.

With the amount of funds being spent on e-mail marketing, it is imperative that those advertising campaigns produce profitable results. This requires e-mail advertising service providers to offer focused, result-driven, advertising methods. A basic premise to begin with is the notion that e-mail advertisements must produce a positive association in the consumers' mind with the advertised product. A negative association, which can be produced by advertising through unsolicited e-mail, not only does not benefit the organization, but may actually harm it in the long run. For example, if a business buys a list of e-mail addresses from an industry that has a similar customer base, the response they get from the recipient may have quite the opposite effect of that intended. Unsolicited e-mail messages, also referred to as spam or junk e-mail, may annoy the consumer so much that a negative connotation with the product is formed in the consumer's mind, thus reducing sales in off-line markets through poor brand name association.

One way to avoid the negative association created through unsolicited e-mail advertisements is to advertise through solicited e-mails. That is attach advertisements to standard e-mail messages (or other solicited communications) that are being sent between individuals that have a personal or professional relationship. Advertising in this manner is much less intrusive and appears to the recipient as a platform for the message, instead of the message itself. There are currently two different business plans that utilize solicited e-mail for advertising. These two business methods are the "desired account" method (referred to as the Hotmail™ method) and the "paid advertisement" method (referred to as the NightMail™ method).

Hotmail™ provides an Internet user with an e-mail address in exchange for placing a Hotmail™ (or affiliate) interactive link within every e-mail message that originates from the account. This allows Hotmail™ to advertise itself to recipients of e-mail messages in exchange for providing and maintaining an e-mail address. The reason this is referred to as the "desired account" method is due to the popularity of the Hotmail™ name. Internet users prefer to have a Hotmail™ account over other similar accounts (e.g., Mail.com), which are also free, because of the name recognition associated with it.

There are three problems with advertisers using the "desired account" method. First, there is a great deal of setup costs associated with a Web site capable of receiving, storing, and transmitting high quantities of data, as required by an e-mail service provider. Second, the advertiser would need brand name recognition capable of enticing Internet users to become e-mail subscribers, which may prove to be quite hard if the advertiser is not as well known (and attractively viewed) as Hotmail™. Third, an Internet user that already has an e-mail account would be less inclined to sign up for a second one, which would force the Internet user to monitor and maintain multiple e-mail account.

NightMail™ provides an Internet user with an e-mail address in exchange for placing interactive advertisement links within every e-mail message that originates from the account. Additionally, the Internet user is rewarded through a point system if the advertisement is deemed successful. The points can later be redeemed through the Web site for merchandise or money. This is referred to as the "paid advertisement" method because Internet users are paid (in points) for using the NightMail™ service. By paying Internet users to use such a service, businesses that don't have the brand name recognition can pay to have their advertisements included in solicited e-mails.

There are four problems with advertisers using the "paid advertisement" method. First, as discussed above, Internet users that already have an e-mail account would be less inclined to sign up for a second one, which would force the Internet user to monitor and maintain multiple e-mail accounts. Second, in the absence of any subscription questionnaire (which would only provide moderate information anyway), the advertiser would have no idea what demographic is going to be exposed to the advertisement or whether the recipient of the e-mail will be a consumer that would be inclined to purchase the advertising product. For example, advertisements for dating services could be sent to married couples, which provides the advertiser with little benefit. This leads to the third problem, given that the advertisements are placed at random, the recipient may be offended by the advertisement, thus creating a negative association with the product. Not only does this reflect poorly on the advertiser, but it also reflects poorly on the sender of the e-mail, possibly discouraging future use of such a service. For example, advertisements for McDonalds could be viewed as offensive if they are sent to a Hindu. Fourth, when the advertisers realize the problems associated with such a system, they will only pay the Internet users for advertisements that prove to be successful (e.g., the recipient interacts with the advertisement or makes a purchase). However, this is extremely unfair to the Internet user when you consider that 40% of people who purchase a product after they view an online advertisement do so between eight and thirty days after seeing the advertisement.

From the above discussion, it is clear that an e-mail advertisement service provider should appeal to the e-mail recipient, the e-mail sender, and the advertiser in order to be effective in the marketplace. In order to appeal to the e-mail recipients, the e-mail containing the advertisement should be solicited. Thus, it would be preferable if the e-mail message came from someone the recipient knew, either personally or professionally, and the content of the e-mail message was not primarily related to the advertisement. Additionally the advertisement would have to be non-offensive to the recipient.

In order for an e-mail advertisement service provider to appeal to a sender of e-mail, the sender should be adequately compensated for his trouble. This would include compensating the sender for the mere presence of an advertisement in a sent communication (whether that communication be e-mail, chat-room dialog, instant messaging, etc.). This compensation would obviously be increased if the advertisement was interacted with and/or purchases were made. Additionally, the e-mail service should work in conjunction with a sender's existing e-mail address, thus enabling the sender to only have to monitor and maintain one e-mail account. Finally, the sender should be able to choose which advertisements (or advertising entities) are to be included in his e-mail. For example, this would allow an individual with an interest in sports to attach a Nike™ advertisement to his e-mail, thus portraying the individual as an athletically minded individual, much like one does when one wears a t-shirt containing the Nike™ logo.

Finally, an e-mail advertisement service provider would appeal to an advertiser if the end product produced advertisements that were placed before interested consumers. By giving the sender the ability to choose which advertisements should be incorporated within his e-mails, the advertising message gets displayed before the sender, who is most likely a consumer of the advertised product, and before the recipient, who, by association, is more likely than not to also share the same interests as the sender. Additionally, the advertising service should be capable of distributing e-mails and advertisements to recipients operating on non-traditional Internet devices (e.g., mobile phones). The service should also be flexible enough to adapt to changes within the on-line advertising industry.

Thus, a need exists, and it would be desirable, for a flexible, device and data neutral system that compensates Internet users for sending personal communications containing user selected advertisements, and providing additional communication data to those recipients that interact with the selected advertisements.

SUMMARY OF THE INVENTION

The present invention provides a system and method for adding an advertisement to a personal communication and providing additional communication data to a recipient that interacts with the advertisement regardless of the network device the recipient is utilizing (e.g., personal computer, television set-top box, telephone, consumer appliance, PDA, WAP mobile phone, I-Mode mobile phone, 3G device, WED, WID, DAB device, etc.). In the preferred embodiment of the present invention, a sender network device, a recipient network device, and a Web site are connected to, and can communicate through a communication network, such as, the Internet, local area network, wide area network, or digital audio broadcast (DAB). The sender network device communicates with an advertising application operating on the Web site to send a personal communication containing a sender-selected advertisement to the recipient network device. If the advertisement is interacted with, the advertising application provides the recipient network device with additional communication data.

To send a personal communication containing a sender-selected advertisement, the sender network device communicates with the advertising application operating on the Web site. If it is the first time the sender is communicating with the Web site, the sender may be asked to register with the Web site, where registration data and an associated identification number is stored in a Web site memory device. Thereafter the sender will have an opportunity to enter message data (e.g., recipient data, subject data, message content data, and file attachment data) and select an advertisement that will be sent along with the message data to a designated recipient. The sender may choose an advertisement from a sender created palette of advertisements or from a list of available advertisements divided into searchable categories. When the sender indicates that the message is ready to be sent, the advertising application is presented with message data (pertaining to the personal communication), sender data (pertaining to the sender), and advertisement data (pertaining to the sender-selected advertisement). The advertising application then assigns an identification number to the message data, as previously done for the sender data (upon registration) and advertisement data (upon submission), and stores the data in the Web site memory device. The advertising application then utilizes the message data, sender data and advertisement data to format, and send, a personal communication containing a sender-selected advertisement to the designated recipient.

Advertisements and additional communication data can be provided by the sender of the personal communication, third party advertisers, or the Web site. If the sender-selected advertisement is provided by a third party advertiser, then the sender of that advertisement is compensated for sending it to at least one recipient. Additional compensation may be awarded to the sender if the recipient interacts with the advertisement or goes on to purchase a good or service from the third party advertiser. The message, sender, and advertisement data allow the advertising application to determine the compensation due to a particular sender.

If the advertisement contained in the personal communication is static, it is displayed on the recipient network device. However, if the advertisement is interactive, and the advertisement is interacted with, the advertising application will provide the recipient with additional communication data in a format that can be understood by the recipient network device. This is done by utilizing the Web site's platform independent architecture, which is developed using a device and data neutral software language, such as XML (Extensible Markup Language), along with an advertising application divided into separate output and data processing stages.

When a recipient interacts with an interactive advertisement, the request data (contained in the advertisement's embedded URL) calls to the data processing layer. The data processing layer uses the request data (which may contain message data that is linked to sender data and advertisement data) to retrieve data from the Web site memory device. A portion of the retrieved data is then passed on to the output stage, where it is placed in a template that has been optimized for the targeted recipient network device.

An advertiser network device may also be connected to the Internet, thus enabling advertisers to upload advertisements and additional communication data to the Web site. Additionally, advertisers may be allowed to gather statistical data based-upon a particular advertisement campaign. A staff network device may also be connected to the Internet, thus enabling a staff member to maintain the Web site and derive system intelligence.

In another embodiment of the present invention, the Web site will generate, and send a personal communication containing a sender-selected advertisement, where the personal communication is directed to a sender-selected recipient. If the sender-selected advertisement is interactive, and it is interacted with, the recipient network device will be provided with additional communication data. Additionally, a display client may be provided to the recipient network device, enabling the recipient network device to display a first portion of the additional communication data when it is received.

In another embodiment of the present invention, a mobile client will be provided to a mobile sender device, enabling the mobile sender device to send a personal communication containing a sender-selected advertisement to a recipient. The mobile client, which operates on the mobile sender device, works together with the advertising application to send personal communications over the Internet or over a wireless network infrastructure.

A more complete understanding of the system and method for adding an advertisement to a personal communication will be afforded to those skilled in the art, as well as a realization of additional advantages and objects thereof, by a consideration of the following detailed description of the preferred embodiment. Reference will be made to the appended sheets of drawings which will first be described briefly.

BRIEF DESCRIPTION OF THE DRAWINGS

FIG. 11 is a flow diagram illustrating how a mobile client operating on an mobile sender device is used together with an application program operating on a Web site to provide a personal communication containing an advertisement to a recipient.

DETAILED DESCRIPTION OF THE PREFERRED EMBODIMENT

The present invention provides a system and method for adding an advertisement to a personal communication and providing additional communication data to a recipient that interacts with the advertisement regardless of the network device the recipient is utilizing. In the detailed description that follows, like element numerals are used to describe like elements illustrated in one or more figures. Various terms and acronyms are used throughout the detailed description, including the following:

Application Program. Within the context of computer hardware and software, an application program is a set of one or more computer programs that performs a function when executed within a computer hardware device. If the set is comprised of plural programs, the programs are coordinated to perform a function together; such programs may individually perform other functions. Similarly, a program may be comprised of plural modules that perform certain functions individually and other functions when combined in various ways.

Internet. A collection of interconnected (public and/or private) networks that are linked together by a set of standard protocols (such as TCP/IP and HTTP) to form a global, distributed network. (While this term is intended to refer to what is now commonly known as the Internet, it is also intended to encompass variations which may be made in the future, including changes and additions to existing standard protocols.)

Web Site. A computer system that severs informational content over a network using the standard protocols of the World Wide Web. Typically, a Web site corresponds to a particular Internet domain name and includes the content associated with a particular organization.

Web Server. A device for transmitting data over the Internet (which may also prevent the transmission of data) encompassing the hardware/software server components that serve information content over a network and the "back end" hardware/software components, including any non-standard or specialized components, that interact with the server component to perform services for Web site users.

The foregoing definitions are not intended to limit the scope of the present invention, but rather are intended to clarify terms that are well understood by persons having ordinary skill in the art. It should be appreciated that the defined terms may also have other meanings to such persons having ordinary skill in the art. These and other terms are used in the detailed description below.

Figure 1:
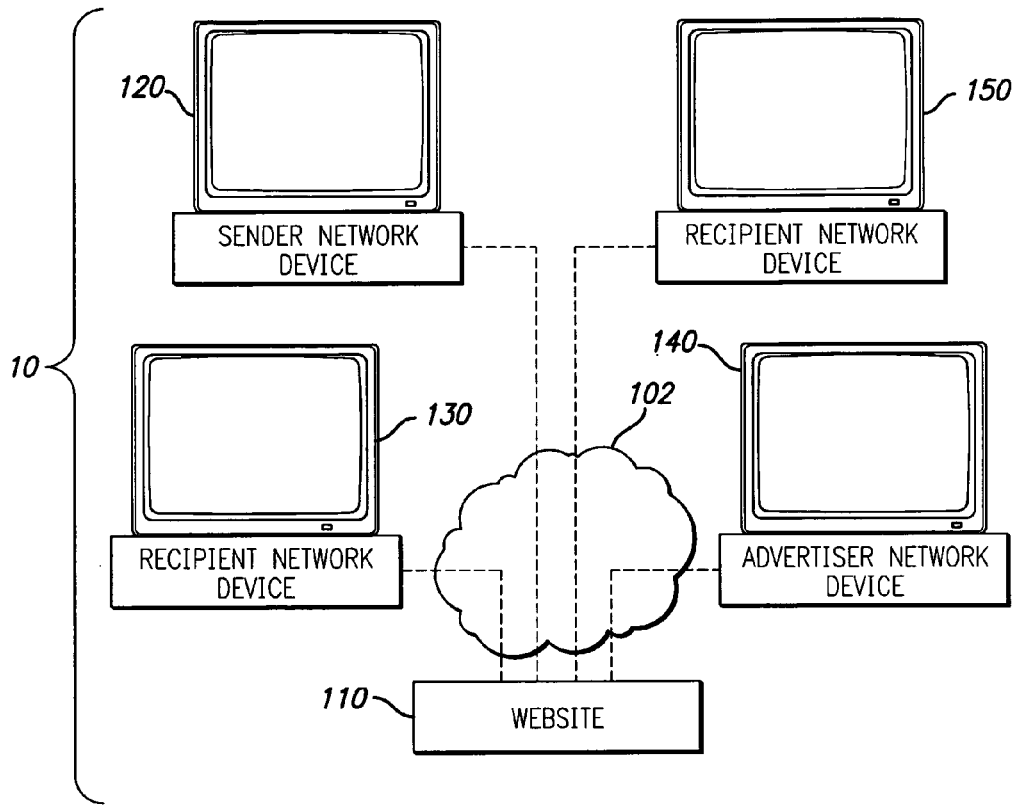
FIG. 1 is a high level architectural drawing of a system that operates in accordance with one embodiment of the present invention to send a personal communication containing an advertisement to at least one recipient over a network.

Preferred embodiments of the present invention operate in accordance with a plurality of network devices, such as, a sender network device, a recipient network device, and a Web site. The sender network device, the recipient network device, and the Web site are coupled together on a communication network, such as, the Internet, local area network, wide area network, or digital audio broadcast (DAB). FIG. 1 depicts an advertising system 10 that operates in accordance with one embodiment of the invention. In this embodiment, the Web site 110, the sender network device 120, the recipient network device 130, an advertiser network device 140, and a staff network device 150 are connected to, and can communicate through, the Internet 102. It should be appreciated that the network devices depicted in FIG. 1 (i.e., sender network device 120, recipient network device 120, advertiser network device 140, and staff network device 150) are intended to be representative in nature and are not to be viewed as limitations, either as to the number or type of network devices utilized in the present invention. Other network devices, including, but not limited to, personal computers, television set-top boxes, telephone, consumer appliances, personal digital assistances (PDAs), wireless application protocol (WAP) mobile phones, I-Mode mobile phones, 3G devices, wireless entertainment devices (WEDs), wireless information devices (WIDs), digital audio broadcast (DAB) devices, and other physical and wireless connected network devices, regardless of their network protocol (e.g., Jini, Bluetooth), generally known to those skilled in the art are within the scope and spirit of this invention.

Figure 2:
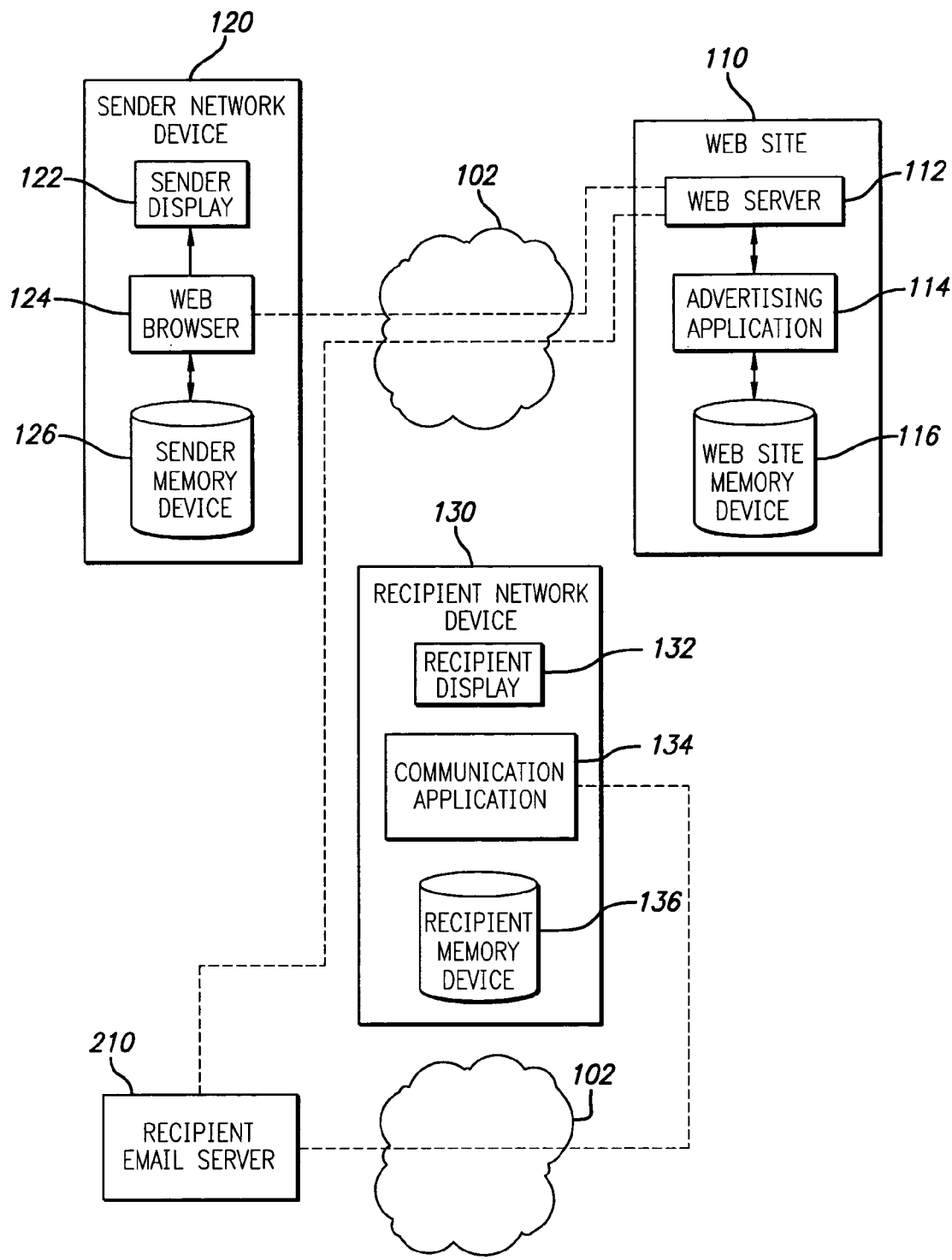
FIG. 2 is a diagram illustrating the primary components of the system illustrated in FIG. 1.

As shown in FIG. 2, the sender network device 120 includes a sender display 122, a Web browser 124, and a sender memory device 126. The recipient network device 130 includes a recipient display 132, a communication application 134, and a recipient memory device 136. Finally, the Web site includes a Web server 112, an advertising application 114, and a Web site memory device 116. The advertising application 114, operating on the Web site 110, permits a sender to create, and send a personal communication containing a sender-selected advertisement to the communication application 134, operating on the recipient network device 130. For an e-mail message, the communication application 134 may be an e-mail application (e.g., Microsoft Outlook™), whereas for chat-room messages, the communication application 134 may be a Web browser. The personal communication received by the communication application 134 may be displayed on the recipient display 132 or stored in the recipient memory device 136. It should be appreciated that the memory and display devices depicted in FIG. 2 are intended to be representative in nature, and other ft embodiments are within the scope and spirit of this invention. The memory devices depicted in FIG. 2 (i.e., sender memory device 126, recipient memory device 126, and Web site memory device 116) can be long or short term data storage devices, including, but not limited to, RAM, cache memory, flash memory, magnetic disks, optical disks, removable disks, SCSI disks, IDE hard drives, tape drives, smart cards, and all other types of data storage devices (and combinations thereof, such as RAID devices) generally known to those skilled in the art. The display devices depicted in FIG. 2 (i.e., sender display 122 and recipient display 132) can be a video monitor, television, LCD/plasma flat screen, or any other display devices generally known to those skilled in the art.

The sender network device 120 is used to send a personal communication, together with a sender-selected advertisement, to the recipient network device 130 via the Web site 110. It should be appreciated that a personal communication can include, but is not limited to, an e-mail message, text message, short message service (SMS) message, chat-room message, instant messaging message, video message, voice message, and any other personalized network communications generally known to those skilled in the art. Additionally, the personal communication can contain message data including, but not limited to, text data, graphic data, audio data, video data, and all other types of electronically transmitted data generally known to those skilled in the art. The sender-selected advertisement that is contained within the personal communication can either be static or interactive. A static advertisement is an icon, graphic, text message, or voice message that is intended to provided the recipient with a simple message, wherein the simple message can be obtained by viewing and/or hearing the static advertisement. An interactive advertisement is an icon, graphic, text, or voice message that can be interacted with to provide the recipient with additional communication data, wherein the additional communication data is provided to the recipient when the recipient interacts with the advertisement. It should be appreciated that the types of additional communication data include, but are not limited to, text data, graphic data, voice data, video data, and all other types of electronically transmitted data generally known to those skilled in the art.

Figure 3:
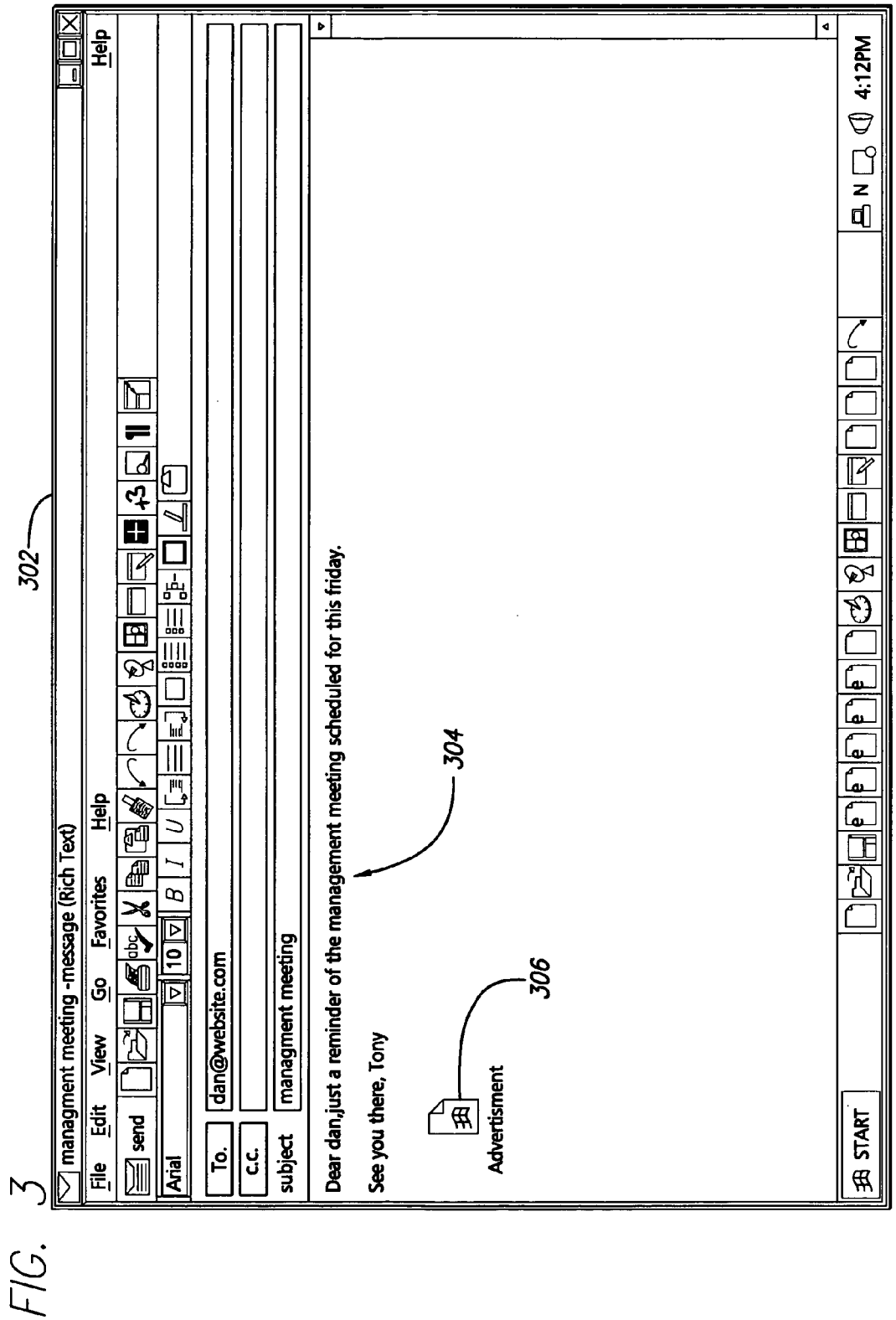
FIG. 3 is a diagram illustrating an e-mail message containing a sender-selected advertisement.

FIG. 3 shows an e-mail message 302 directed to a recipient. The e-mail message contains a personal message 304 and a sender-selected advertisement 306. If the sender-selected advertisement 306 is a static advertisement, then the recipient will merely have an opportunity to view the advertisement as provided in the e-mail. If the sender-selected advertisement 306 is an interactive advertisement, then the recipient will also have an opportunity to interact with the advertisement to receive additional communication data. It should further be appreciated that the source of the advertisement (either static or interactive), as well as any additional communication data, can be provided by the sender of the personal communication, a third party advertiser, the Web site, or any other party that has access to the Internet. For example, the sender, in an attempt to share some humor, may send a personal communication to a recipient containing an interactive, sender-provided, advertisement that advertises an animated cartoon. If the recipient interacts with the interactive advertisement, the recipient will be provided with additional communication data (e.g., graphic, text, audio, video) pertaining to the animated cartoon. Alternatively, the sender, for either esthetic or compensatory reasons, may send a personal communication to a recipient containing an interactive, third party advertiser-provided, advertisement that advertises Nike™. If the recipient interacts with the interactive advertisement, the recipient will be provided with additional communication data (e.g., graphic, text, audio, video) pertaining to Nike™. It should be appreciated that these examples are not intended to limit the subject matter of the additional communication data that can be provided to the recipient network device. The additional communication data can contain advertisement data, entertainment data, educational data, or any other type of data made available to the Web site.

To send a personal communication containing an advertisement to a recipient, the sender should interface to the Web site 110 via the sender network device 120. Specifically the Web browser 124, operating on the sender network device 120, interfaces over the Internet 102 with the Web server 112, which is operating on the Web site 110. If the sender has not used the Web site 110 before, data may be displayed on the sender display 122 prompting him to register. Registration may include providing data, such as name, e-mail address, mailing address, and profile information. After registration is complete, a user name and password should be e-mailed to the e-mail address provided by the sender. The sender then uses the user name and password to access a communication page on the Web site 110.

Figure 4:
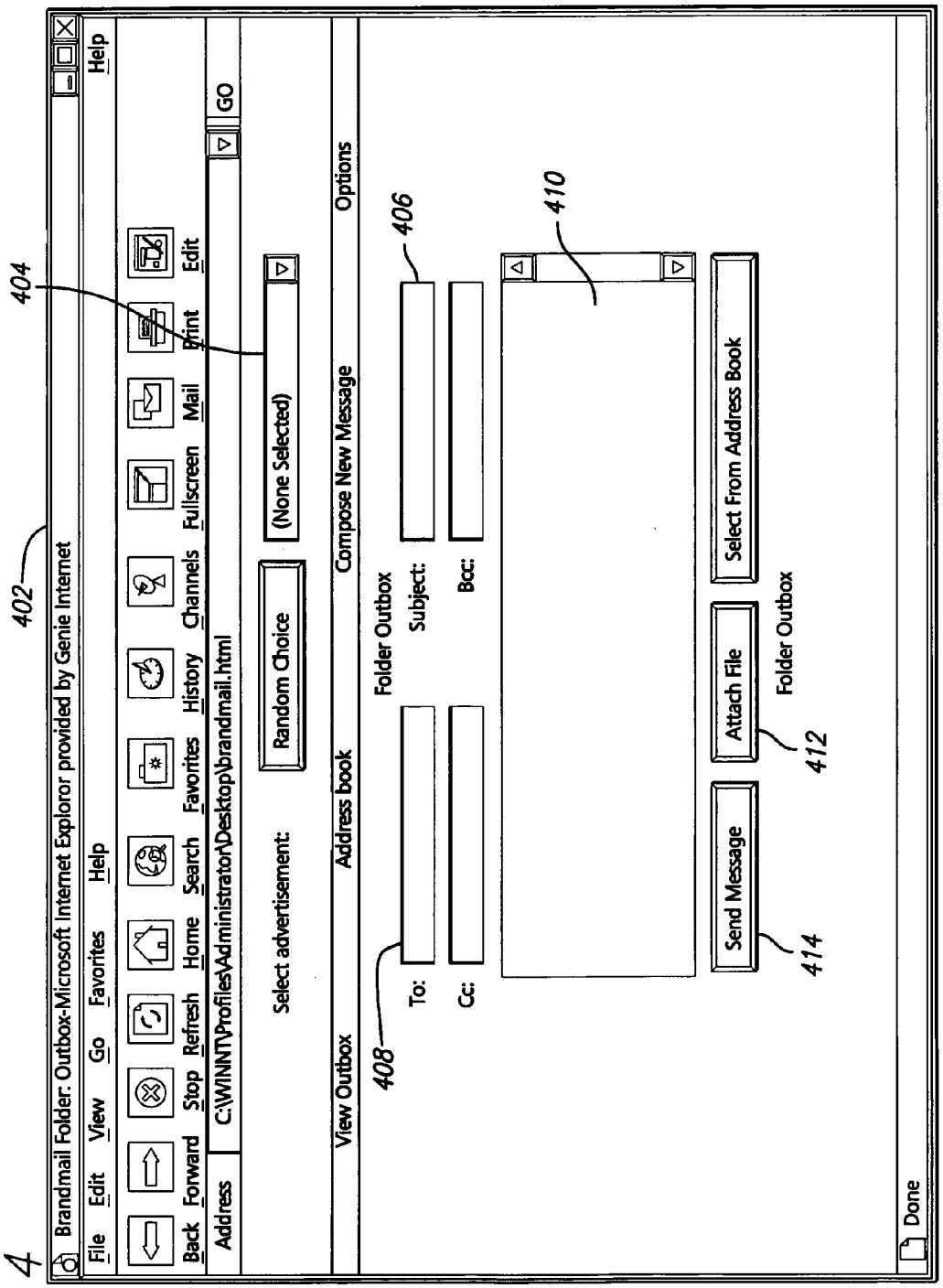
FIG. 4. is a diagram illustrating an exemplary Web page utilized to gather data for providing a recipient with an e-mail containing a sender-selected advertisement.

If the sender indicates a desire to send an e-mail to a recipient, he may be provided with an e-mail communication page 402, as shown in FIG. 4. It should be appreciated that other communication pages specifically designed for sending text messages, SMS messages, chat-room messages, instant messaging messages, video messages, voice messages, and other personal communications are within the sprit and scope of this invention. The e-mail communication page 402 provides a recipient space 408 where the sender can designate at least one recipient that will receive the e-mail. The sender is further provided a subject space 406 and a message space 410, where the subject matter and the contents of the e-mail can be added. The e-mail communication page 402 may also provide the sender with an attach file button 412, which allows the sender to attach separate files to the e-mail that are to be routed to the designated recipient(s). The e-mail communication page 402 further provides a pull down menu 404 for selecting an advertisement that is to be included within the e-mail. The pull down menu 404 gives the sender the ability to choose an advertisement from a sender created palette of advertisements.

Each sender is allowed to generate an individual palette of advertisements stored in the Web site memory device 116 (see FIG. 2). The palette contains advertisements that the sender has previously selected. The sender may have the option of adding additional advertisements to the palette and removing advertisements from the palette. Additionally, the advertising application, the third party advertisers, or the Web site staff may also have the ability to remove advertisements from the sender's palette (e.g., upon the expiration of an advertisement). To aid in the adding of advertisements to the sender's palette, the sender will be able to choose from available advertisements that are stored in the Web site memory device 116 (see FIG. 2). The available advertisements are sorted by category, making them easier for the sender to locate. The categories may include, but are not limited to, advertising source, product category, compensation value, popularity, product name, or date added. Once the sender has a palette of advertisements, those particular advertisements will be displayed to the sender through the pull down menu 404. The sender has the option, through the pull down menu 404, to select an advertisement to accompany the e-mail, select that no advertisement is to accompany the e-mail, or select that an advertisement should be randomly selected, either from the sender's palette or from the available advertisements, to accompany the e-mail.

At this point, the sender can depress the send message button 414 to send the e-mail (which includes the attachment (s) and the selected advertisement) to the designated recipient (s). The reply-to data contained in the e-mail, which is the e-mail address that is used if the recipient depressing the "reply-to" button on their e-mail client (e.g., Microsoft Outlook™), is replaced with the e-mail address provided by the sender upon registration. This allows replies (using the "reply-to" button) to e-mails to be routed directly to the sender's provided e-mail address. The e-mail will appear to the recipient as if it came from an e-mail advertisement service provider's domain. If the recipient attempts to route an e-mail reply to the listed address, the advertising application 114 (see FIG. 2) will re-route the e-mail to the sender's provided e-mail address.

Referring back to FIG. 2, data pertaining to the sender's e-mail will be stored in the Web site memory device 116 at approximately the time the e-mail is routed to the designated recipient(s). This data may include, but is not limited to, message data (pertaining to the personal communication), sender data (pertaining to the sender), advertisement data (pertaining to the sender-selected advertisement), and identification numbers associated with each group of data. The sender data and the advertisement data (or their identification numbers) will allow the advertising application 114 to keep track of the advertisements that are being sent, and the senders that are sending those advertisements. The message data, which is linked to the sender data and the advertisement data, allows the advertising application 114 to provide additional communication data to a recipient that interacts with an interactive advertisement (discussed below).

In another embodiment of the present invention, the sender may submit a populated communication page as additional communication data (as opposed to personal communication data). In this instance the advertising application 114 generates a personal communication directed to a sender-provided recipient. The personal communication is sent containing a sender-selected advertisement that is adapted to provide an interacting recipient with additional communication data (i.e., the populated communication page). The sender-provided recipient and the sender-selected advertisement may be provided by the sender or extracted by the advertising application 114 from the sender-submitted populated communication page. For example, if a sender submitted a populated e-mail communication page as additional communication data, then the advertising application 114 would generate a personal communication directed to the recipient contained within the populated e-mail communication page. The advertising application 114 would then create an interactive advertisement from data containing within the populated e-mail communication page (e.g., sender name, subject matter, content). The personal communication, containing the interactive advertisement, would be routed to the recipient network device 130. If the recipient interacted with the interactive advertisement, the recipient would be provided with the populated e-mail communication page submitted by the sender.

As previously discussed, the advertisement, as well as the additional communication data may be provided by a variety of sources (e.g., sender of the personal communication, third party advertiser, or Web site). If a sender-selected advertisement is provided by a third party advertiser, then the sender of that advertisement is compensated for sending it to at least one recipient. The sender, in this particular case, will be compensated for the mere sending of the advertisement. Additional compensation may be awarded to the sender if the recipient who receives the advertisement interacts with it. The sender may also receive additional compensation if the recipient purchases a good or service from the advertiser after interacting with the interactive advertisement. It should be appreciated that compensation including, but not limited to, money, products, services, points that are redeemable for goods or services, and other forms of compensation generally known to those skilled in the art are within the scope and spirit of this invention.

Figure 5:
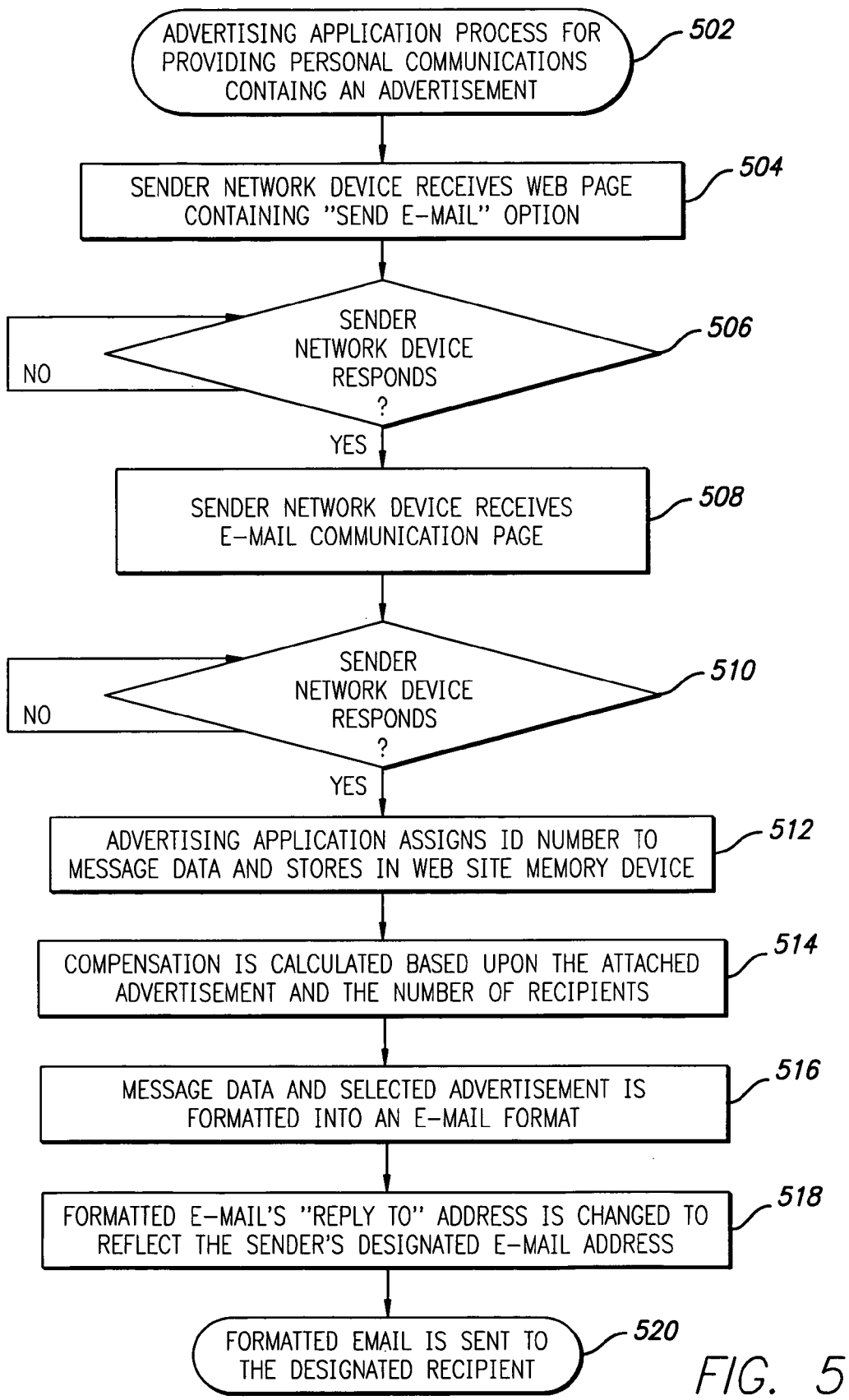
FIG. 5 is a flow diagram illustrating how an advertising application generates and transmits an e-mail containing a sender-selected advertisement.

FIG. 5 outlines, beginning at step 502, the process the advertising application goes through to provide the recipient network device with an e-mail containing an advertisement.

At step 504, the advertising application provides a Web page containing a "send e-mail" option to the sender network device. The advertising application, at step 506, receives a response from the sender network device indicating that an e-mail should be sent. At step 508, the advertising application provides the sender network device with an e-mail communication page (see FIG. 4), enabling the sender to enter at least one designated recipient, the subject matter, the content, any attachments, and a selected advertisement that should accompany the completed e-mail. The end result is a compilation of data that includes sender data, advertisement data, and message data. The advertising application, at step 510, receives a response from the sender network device indicating that a compilation of data is being submitted. At step 512, the advertising application receives the compilation of data, which includes message data, sender data, and advertisement data, and assigns an identification number to the message data. The compiled data is then stored in the Web site memory device. The identification number, as assigned to the message data, and as previously assigned to the sender data (upon registration of the sender) and the advertisement data (upon submission of the advertisement), enables the advertising application to easily search for individual entries and link individual entries with other individual entries. The advertising application then determines the compensation that is due the sender, at step 514, based upon the selected advertisement and the number of recipients that will receive the selected advertisement. At step 516 the message data (which includes the selected advertisement) is formatted into a standard e-mail format. The formatted e-mail's reply-to address is changed, at step 518, to reflect the senders e-mail address that was provided by the sender upon registration. At step 520, the formatted e-mail is sent to the designated recipient(s).

Referring back to FIG. 2, assuming the designated recipient is the recipient network device 130, the formatted e-mail is routed from the Web site 110 to the recipient e-mail server 210, where the e-mail is re-formatted so that it can be read by the recipient network device 130. For example, if the recipient network device is a mobile phone, the e-mail service provider for that mobile phone is set up to re-format incoming e-mails so they are properly displayed on the mobile phone's display. In another embodiment of this invention, the Web site 110 further includes a system and method for receiving and transmitting e-mails to network devices, regardless of the type of network device that is being used. The e-mail server will utilize a POP3, IMAP, or other standard e-mail protocol to receive and store e-mails. Additionally, the same platform independent architecture used in transmitting additional communication data to network devices (as discussed below) will be used in connection with the e-mail server, thus allowing e-mails to be transmitted to a variety of network devices, regardless of the different e-mail format requirements. Regardless of which e-mail server is used, the re-formatted e-mail (which contains the sender-selected advertisement) is forwarded on to the communication application 134 operating on the recipient network device 130.

If the advertisement contained in the e-mail is static, it can be displayed or performed on the recipient display 132 (which may require speakers for performance of audio advertisements). However, if the advertisement is interactive, and the advertisement is interacted with, additional communication data will be provided to the recipient network device 130. The location of the additional communication data (or a pointer to the data) is contained in a URL embedded within the interactive advertisement. A URL (or Uniform Resource Locator) contains a unique address which fully specifies the location of data on the Internet. Unlike most advertisement URLs which provide data directly from the advertiser's Web site, the URL embedded within the sender-selected advertisement provides the recipient network device 130 with data from the Web site 110, and more particularly from the Web site memory device 116. This data stored on the Web site memory device 116 may itself be the additional communication data that is to be provided to the recipient network device 130 or it may contain the address of such data. Regardless, the additional communication data will be provided to the recipient network device 130 by the advertising application 114 operating on the Web site 110. Additionally, it will be provided to the recipient in a format that can be understood by the recipient network device.

This is done by utilizing the Web site's 110 platform independent architecture. The platform independent architecture (a portion of the advertising application) is developed using a software language that is device and data neutral, such as XML (Extensible Markup Language). XML is device and data neutral because it is not a single, predefined markup language. Instead it is a metalanguage, which is a language for describing other languages, allowing customized markup languages to be defined for different classes of documents. It should be appreciated that other device and data neutral languages generally known to those skilled in the art are within the spirit and scope of this invention.

This device/data neutral language (e.g., XML) is used together with the advertising application 114, which is constructed using a Model View Controller design pattern. In other words, The output stages of the advertising application are separate from the data processing layer, which enables all data processing to be device independent and can be used regardless of the recipient network device 130 requesting data. Although the advertising application is described as being constructed using the Java language, it should be appreciated that other modern program languages generally known to those skilled in the art are within the scope and spirit of this invention.

Figure 6:
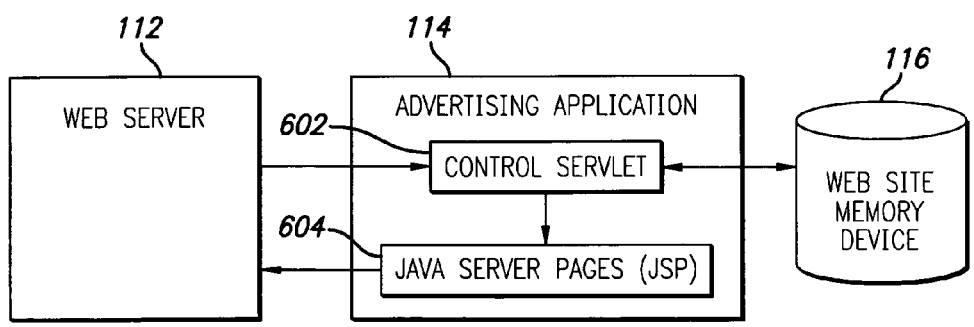
FIG. 6 is a diagram illustrating the primary components responsible for the device and data neutral functionality of the system illustrated in FIG. 1, specifically the separation of data processing and data output within an advertising application.

As shown in FIG. 6, the advertising application 114 further contains two sub-applications, referred to as a control servlet 602 and a JSP (Java Server Page) 604. It should be noted that the phrase "control servlet" is used here in its generic sense, actually referring to one of many specific servlets operating on the advertising application 114. Additionally, the JSP sub-application 604, as used here, is actually referring to one of a plurality JSPs, where each JSP is responsible for performing a specific function for a specific type of network device. When a recipient interacts with an interactive advertisement, the request data (contained in the URL) refers to the control servlet 602. The control servlet 602 uses the request data to retrieve data from the Web site memory device 116, and provide an output portion of that data to the JSP 604. The output data is then placed within the JSP 604 template that has been optimized for the targeted, recipient network device 130.

Figure 7:
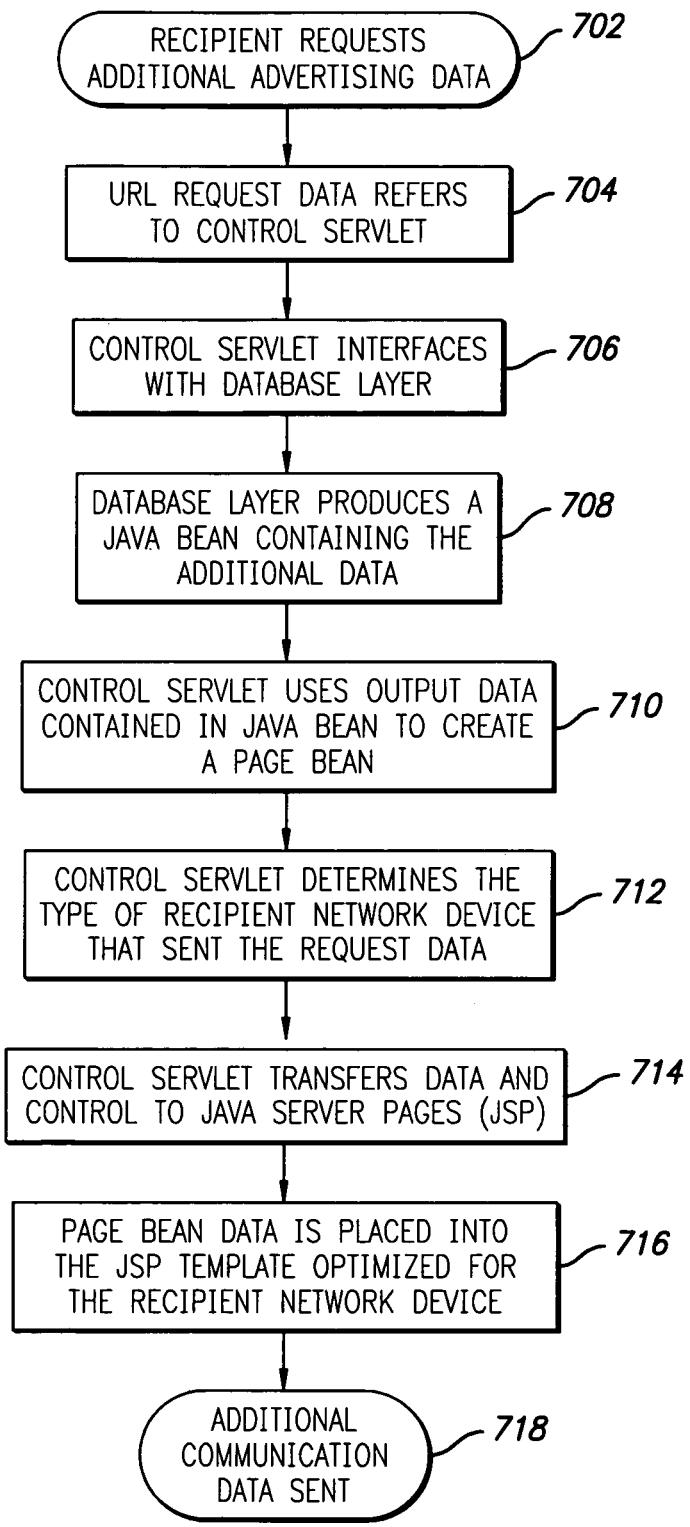
FIG. 7 is a flow diagram illustrating the process of providing additional communication data to a recipient.

The flow diagram in FIG. 7 outlines what happens when a recipient interacts with an interactive advertisement 702. When an interactive advertisement is interacted with, as in step 704, request data (contained in the URL) is directed to the control servlet. At step 706, the control servlet calls for additional data, based upon identification numbers (e.g., memory ID, sender ID, advertisement ID) contained in the request data, from a database software layer, which has access to the Web site memory device. At step 708, the database software layer provides the additional data to the control servlet in at least one populated Java Bean. The control servlet, at step 710, uses the output data contained in the Java Bean to produce a Page Bean. At step 712, the control servlet determines the type of recipient network device that made the request. This information is embedded within the HTTP protocol (HyperText Transport Protocol), which is the standard client-server protocol used on the World Wide Web, and thus used to send the URL request data from the recipient network device to the control servlet. The control servlet then directs the Page Bean, data identifying the type of recipient network device, and control to the JSP at step 714. At step 716, the data contained within the Page Bean is placed into the JSP template optimized for the recipient network device. The populated JSP template (i.e., template containing additional communication data) is then sent to the recipient network device at step 718. This platform independent architecture not only allows additional communication data to be transmitted to an interacting recipient, it allows data to be provided to a variety of network devices, regardless of the request. The output from the Web site 110 is capable of providing data to a variety of sender network devices and recipient network devices, regardless of whether that data is additional communication data, Web page data, or e-mail data.

Referring back to FIG. 1, the advertiser network device 140 is connected to, and can communicate through the Internet 102. This enables an advertiser to communicate with the Web site 110. To do this, the advertiser is given a user account, which includes a user name and password, which allows the advertiser to log on to the Web site 110. Once the advertiser is logged on, the advertiser can use the advertiser network device 140 to upload an advertisement to the Web site 110. To do this, the advertising application 114 provides the advertiser network device 140 with a list of category headings, requesting that the advertiser register the advertisement under at least one of these headings. Once a heading is selected, the advertiser can provide the advertisement to the advertising application 114. If the advertisement is a textual message, the advertising application 114 allows the advertiser the option of typing in the textual information that makes up the advertisement. Alternatively, the advertiser can upload the advertisement data (e.g., text, icon, graphic, audio). If the advertiser selects to upload data, that data should be provided in an acceptable format. For example, icon or graphic data should be provided in JPEG, GIF, or any other generally recognizable graphical format. Audio data should be provided in WAV, MP3, or any other generally recognizable audio format.

The advertiser should at this time specify whether the advertisement is static or interactive. If it is interactive, the additional communication data provided upon interaction, or the location of such data, should be provided so that the additional communication data can be provided to any recipient interacting with the interactive advertisement. The advertiser should then provide information regarding the compensation that is to be paid to senders who include the advertisement within their personal communication. This information may include, but is not limited to, a date and time when the advertisement should be made available, an expiration date, a maximum number of available transmissions, the compensation that is to be paid for each transmission, the compensation that is to be paid each time a recipient interacts with the advertisement, and the compensation that is to be paid each time a recipient purchases a good or service after interaction.

Additionally, once the advertiser, is logged on to the Web site 110, the advertiser can use the advertiser network device 140 to gather statistical data from the Web site memory device 116. This statistical data may include, but is not limited to, the number of times an advertisement has been sent, the number of times an advertisement was interacted with, the number (and currency amount) of purchases made after an advertisement was interacted with, the profile of senders who are sending an advertisement, and the compensation that is due for an advertisement's transmission, interaction, or purchases made thereafter.

As well, the staff network device 150 is also connected to, and communicating through the Internet 102. This enables a Web site staff member to communicate with the Web site 110. To do this, the staff member is given a user account, which includes a user name and password, which allows the staff member to log on to the Web site 110. Once the staff member is logged on, the staff member can access Web pages and acquire information in order to maintain the Web site and derive system intelligence. The Web site maintenance includes, but is not limited to, creating, updating, and removing advertiser and sender accounts, updating sender profiles, administering advertisement campaigns, suspending different service areas, and enabling different service areas. The reporting of system intelligence includes, but is not limited to, usage statistics (e.g., CPU load, number of e-mails sent, number of users), status of advertising campaigns, and revenue streams.

In an effort to prevent fraud, the advertising application is adapted to run a variety of antifraud programs. Such programs may include, but are not limited to, e-mailing a user name and password to a sender's designated e-mail account, allowing only one account to be linked to a single mailing address, and denying compensation to a sender if the sender attempts to send an advertisement more than a pre-determined number of times, send more than a pre-determined number of advertisements within a pre-determined amount of time, send an advertisement to a single recipient more than a pre-determined number of times, or send more than a pre-determined number of advertisements to a single recipient within a pre-determined amount of time. It should be appreciated that other fraud and spamming prevention programs generally known to those in the art are within the scope and spirit of this invention.

In another embodiment of the present invention, a mobile client is provided to a mobile sender device, enabling the mobile sender device to send a personal communication containing a sender-selected advertisement to a recipient. Traditional mobile (wireless) devices, due to their small screen size, small memory capacity, and slow data transmission rate, typically require additional software to interface effectively with the Internet. It should be appreciated that the mobile client could be constructed using Java, SIM Toolkit, or any modern platform generally known to those skilled in the art. In an embodiment of the invention, the mobile client is constructed using the Java platform.

Figure 8:
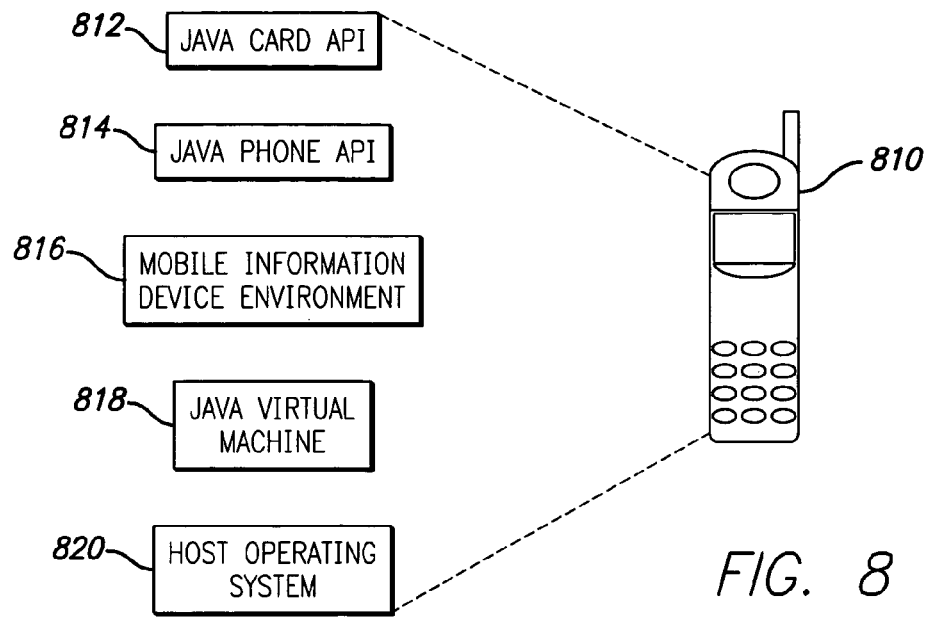
FIG. 8 is a diagram illustrating the various software levels operating on a wireless internet device.

FIG. 8 shows a mobile sender device 810 containing a variety of applications constructed using the Personal Java Platform. It should be appreciated that mobile sender devices include, but are not limited to, wireless application protocol (WAP) mobile phones, I-Mode mobile phones, 3G devices, wireless entertainment devices (WED), wireless information devices (WID), and other wireless network devices generally known to those skilled in the art. The mobile sender device 810 contains a factory provided Host Operating System 812, as depicted in FIG. 8. Additionally, the mobile sender device 810 utilizes a variety of software components that operate on top of the Host Operating System 812, in which the software components are either pre-installed or downloaded by the user of the mobile sender device 810. These software components include a Java Virtual Machine 818, a Mobile Information Device Environment 816, a Java Phone API 814 (Application Programming Interfaces), and a Java Card API 812. The Java Virtual Machine 818 makes the mobile sender device 810 platform independent, thus allowing a single mobile client to be utilized on any mobile sender device. The Mobile Information Device Environment 816 provides a set of tools and APIs that allow applications and user interfaces to interact with the mobile sender device 810. The Java Phone API 814 is utilized to provide access to the generic functions of the mobile sender device 810, whereas the Java Card API 812 is utilized to provide access to the Java Virtual Machine 818 and the capability to store transactions and information.

Figure 9:
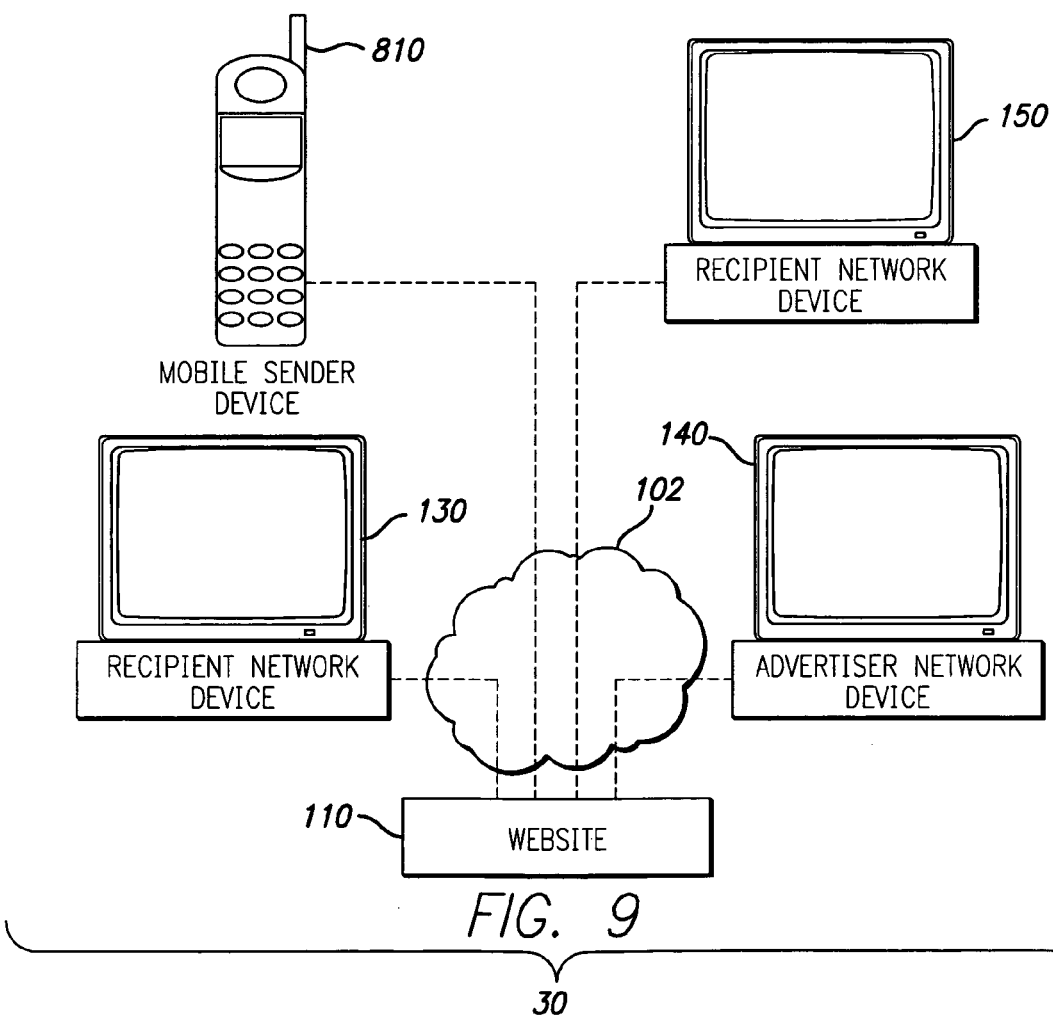
FIG. 9 is a high level architectural diagram illustrating a system that operates in accordance with one embodiment of the present invention to use an e-mail client operating on a mobile Internet device together with an application program operating on a Web site to provide a personal communication containing an advertisement to a recipient via the Internet.

FIG. 9 depicts an e-mail client advertising system 30 that operates in accordance with one embodiment of the invention. In this embodiment, the mobile client is an e-mail client that works together with the advertising application 114 (see FIG. 2) to route an e-mail containing an advertisement to a recipient network device 130. The mobile sender device 810 is connected to, and communicates through, the Internet 102. This allows the mobile sender device 810 to communicate with the Web site 110, and more specifically with the advertising application 114 (see FIG. 2). The e-mail client allows the sender to provide the mobile sender device 810, containing the various software components depicted in FIG. 8, with message data and selected advertisement data. After the message data and selected advertisement data is compiled, and the sender has indicated that the compiled data should be sent, the compiled data (which may include message data, advertisement data, and sender data) is transmitted to the Web site 110. The advertising application 114 (see FIG. 2) stores the compiled data in the Web site memory device 116 and determines the compensation that is due the sender. As previously mentioned, if the recipient network device 130 interacts with an interactive advertisement contained within the e-mail, the recipient network device 130 will be provided with additional communication data pertaining to the request data contained in the URL that is embedded within the interactive advertisement.

Figure 10:
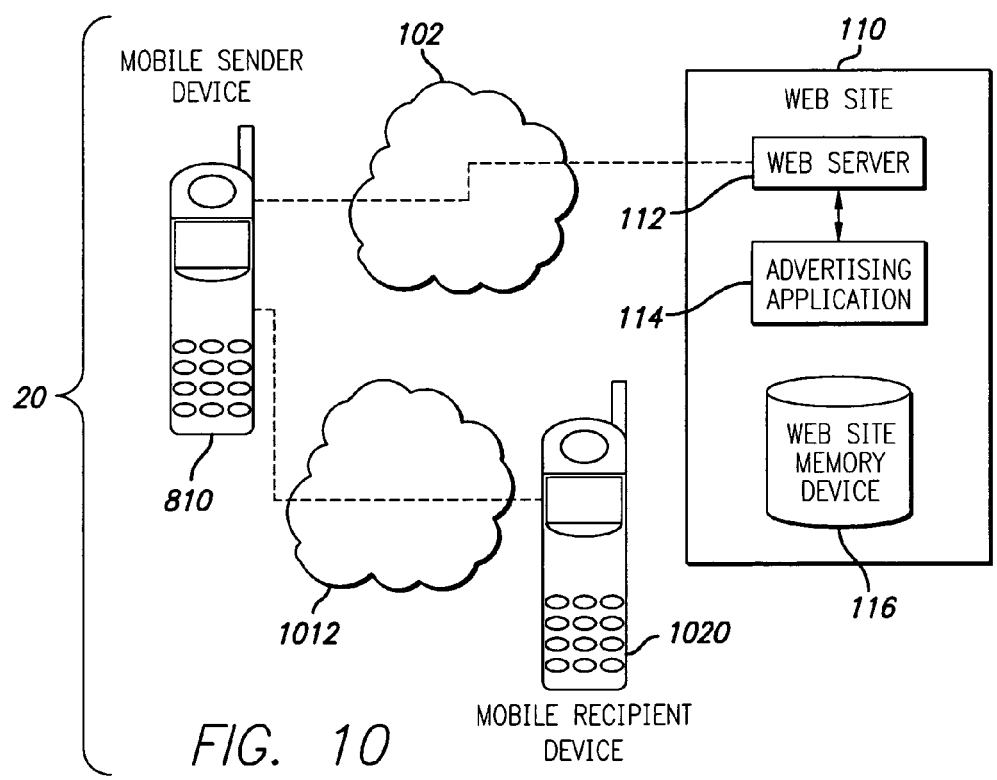
FIG. 10 is a high level architectural diagram illustrating a system that operates in accordance with one embodiment of the present invention to send a personal communication containing an advertisement to a recipient over a wireless network.

FIG. 10 depicts a datagram client advertising system 20 that operates in accordance with one embodiment of the invention. In this embodiment, the mobile client is a datagram client that enables a mobile sender device containing the software component depicted in FIG. 8 to transmit a personal communication containing an advertisement to a mobile recipient device via a wireless network infrastructure. The mobile sender device 810 is connected to and can communicate through the Internet 102. This allows the mobile sender device to communicate with the Web site 110, through the Web server 112. Additionally, the mobile sender device 810 can connect to and communicate through a wireless network infrastructure 1012. This allows the mobile sender device to transmit a personal communication directly to a mobile recipient device 1020, without the entire communication first being routed through the Internet. It should be appreciated that in this embodiment, the personal communications includes communications sent using a short message service (SMS) or any other wireless message sending format generally known to those skilled in the art.

The datagram client will allow the sender to provide the mobile sender device 810 with message data and selected advertisement data. After the message data and selected advertisement data is compiled, and the sender has indicated that the compiled data should be sent, the datagram client will instruct the mobile sender device 810 to route the personal communication, together with the selected advertisement, to the mobile recipient device 1020 via the wireless network infrastructure 1012. At approximately the same time, the datagram client will instruct the mobile sender device 810 to upload the message data, advertisement data, and sender data to the advertising application 114 operating on the Web site 110. The advertising application 114 then stores the data in the Web site memory device 116 and determines the compensation that is due the sender. If the mobile recipient device 1020 interacts with an interactive advertisement contained within the personal communication (e.g, SMS), the mobile recipient device 1020 will be provided with additional communication data pertaining to the request data contained in the URL that is embedded within the interactive advertisement.

A flow diagram in FIG. 11, beginning at step 1102, outlines the process of routing an SMS or e-mail message containing an advertisement to a recipient device when a sending device utilizes a mobile client to generate and send the personal communication. At step 1104, it should be determined whether the personal communication will be a SMS message that will be routed via a wireless network infrastructure, or an e-mail message that will be routed via the Internet.

If an SMS message is to be sent to a mobile recipient device, at step 1128, the mobile sender device uploads the previously downloaded datagram client. This prompts a control servlet, at step 1130, operating on the Web site, to retrieve the sender's palette of advertisements from the Web site memory device and transmit the palette in an XML document to the mobile sender device. At step 1132, the palette is received and stored in the mobile sender device's memory. The sender then selects, at step 1134, the "send SMS" feature provided by the datagram client, which allows an SMS message to be created. At step 1136, the sender selects an advertisement from the palette that will accompany the SMS message. The sender then provides the datagram client with message data, at step 1138, which may include recipient data, subject data, and content data. A compilation of data is then transmitted to a control servlet operating on the Web site, at step 1140, which includes message data, sender data, and advertisement data. Another control servlet assigns an ID number to the message data (as previously assigned to the sender data and the advertisement data), at step 1142, and stores all compiled data in the Web site memory device. At step 1144, the advertising application determines the compensation that is due the sender based upon the selected advertisement and the number of recipients that received the advertisement. The SMS message, along with the selected advertisement, is sent by the mobile sender device, at step 1146, to the designated mobile recipient device over a wireless network infrastructure.

In an alternative embodiment, the mobile sender device routes the SMS message and the selected advertisement over a wireless network infrastructure, where the cost of the transmission is billed to an account provided by the Web site. The compensation (or part thereof) normally sent to the sender is kept by the Web site to subsidize the cost of the wireless transmission.

At step 1104, if the sender determines that an e-mail message is to be sent via the Internet, the mobile sender device should upload, at step 1106, the previously downloaded e-mail client. This prompts a control servlet, at step 1108, operating on the Web site, to retrieve the sender's palette of advertisements from the Web site memory device and transmit the palette in an XML document to the mobile sender device. At step 1110, the palette is received and stored in the mobile sender device's memory. The sender then selects, at step 1112, the "send e-mail" feature provided by the e-mail client, which allows an e-mail message to be created. At step 1114, the sender selects an advertisement from the palette that will accompany the e-mail message. The sender then provides the e-mail client with message data, at step 1116, which may include recipient data, subject data, and content data. A compilation of data is then transmitted to a control servlet operating on the Web site, at step 1118, which includes message data, sender data, and advertisement data. Another control servlet assigns an ID number to the message data (as previously assigned to the sender data and advertisement data), at step 1120, and stores all compiled data in the Web site memory device. At step 1122, the advertising application determines the compensation that is due the sender based upon the selected advertisement and the number of recipients that received the advertisement. The e-mail message, along with the selected advertisement, is then formatted, at step 1124, into an e-mail format. At step 1126, the formatted e-mail message is sent by the advertising application to the designated recipient network device over the Internet.

In another embodiment of the invention, the additional communication data is sent to the recipient network device 130 so that a first portion of the additional communication data can be displayed on the recipient display 132 as soon as the first portion is received by the recipient network device 130. A remaining portion of the additional communication data, which is received after the first portion, does not effect the displaying of the first portion on the recipient network device 130. As well, subsequent portions of the additional communication data, which together make up the remaining portion, can be displayed on the recipient display 132 as soon as each portion is received by the recipient network device 130. If the recipient network device 130 does not support such a function, a display client can be provided by the Web site 110 in a downloadable format. The display client would enable the recipient network device 130 to display a first portion of additional communication data as it is received, which would be beneficial for devices with small screens, small memory capabilities, or slow data transmitting rates.

Having thus described a preferred embodiment of a system and method for adding an advertisement to a personal communication, it should be apparent to those skilled in the art that certain advantages of the system have been achieved. It should also be appreciated that various modifications, adaptations, and alternative embodiments thereof may be made within the scope and spirit of the present invention. The invention is further defined by the following claims.

What is claimed is:

1. A Web host connected to a wide area network (WAN), comprising:
   a Web server adapted to facilitate the communication of a personal electronic communication between a plurality of network devices via said WAN;
   a memory device connected to said Web server and adapted to store a plurality of advertisements; and
   an advertising application operating on said Web host, wherein said advertising application provides the functions of:
      providing at least a portion of said plurality of advertisements to one of said plurality of network devices, said plurality of advertisements including a first advertisement;
      receiving a remove command from said one of said plurality of network devices, said command being used by said advertising application to remove said first advertisement from said plurality of advertisements, thereby creating a palette of advertisements;
      receiving communication data and recipient data, said recipient data being used to identify at least one recipient of said communication data;
      automatically selecting, based on at least a portion of the content of said communication data, at least one advertisement from said palette of advertisements;
      inserting said at least one advertisement and said communication data into said personal electronic communication, wherein said personal electronic communication comprises an e-mail message; and
      sending said personal electronic communication to said at least one recipient via said WAN.

2. The Web host of claim 1, wherein said advertising application further provides the function of sending said at least a portion of the content of said communication data to said at least one recipient via said WAN.

3. A computer-implemented method for communicating personal information between a plurality of network devices via a wide area network (WAN), comprising the steps of:
   providing at least a portion of a plurality of advertisements to one of said plurality of network devices, said plurality of advertisements including a first advertisement;
   receiving a remove command from said one of said plurality of network devices;
   using said remove command to remove said first advertisement from said plurality of advertisements, thereby creating a palette of advertisements;
   receiving communication data and recipient data, wherein said communication data and said recipient data are used to send a personal electronic communication to at least one recipient, wherein said personal electronic communication comprising an e-mail message; and
   selecting by machine-readable instructions stored in memory at least one advertisement from said palette of advertisements based on at least a portion of the content of said communication data;
   sending said personal electronic communication to said at least one recipient via said WAN, wherein said personal electronic communication includes said communication data and said at least one advertisement when it is opened by said at least one recipient.

4. The method of claim 3, further comprising the step of sending additional communication data if said at least one recipient interacts with said at least one advertisement.

5. The method of claim 4, further comprising receiving said additional communication data from a third party advertiser prior to sending said additional communication data.

6. A personal communication system comprising a Web host connected to a wide area network (WAN), said Web host comprising:
   a Web server adapted to facilitate the communication of a personal electronic communication between a plurality of network devices via said WAN;
   a memory device connected to said Web server and adapted to store a plurality of advertisements; and
   an advertising application operating on said Web host and in communication with said memory device, wherein said advertising application provides the functions of:
      providing at least a portion of said plurality of advertisements to one of said plurality of network devices, said plurality of advertisements including a particular advertisement;
      receiving a remove command from said one of said plurality of network devices, said communication being used by said advertising application to remove said particular advertisement from said plurality of advertisements, thereby creating a palette of advertisements;
      receiving communication data and recipient data, said communication data and said recipient data being used to send a personal communication to at least one recipient;

selecting at least one of said palette of advertisements based on at least one subject matter of said communication data;

inserting said at least one of said palette of advertisements into said personal electronic communication, wherein said personal electronic communication comprising an e-mail message;

sending said personal electronic communication to at least one recipient via said WAN; and providing a party with a service in exchange for allowing said Web host to insert said at least one of said palette of advertisements into said personal electronic communication.

7. The personal communication system of claim 6, wherein said step of providing a party with a service in exchange for allowing said Web host to insert said at least one of said plurality of advertisements into said personal electronic communication, further comprises providing said sender with a service in exchange for allowing said Web host to insert said at least one of said plurality of advertisements into said personal electronic communication.

8. The personal communication system of claim 6, wherein said step of providing a party with a service in exchange for allowing said Web host to insert said at least one of said plurality of advertisements into said personal electronic communication, further comprises providing said at least one recipient with a service in exchange for allowing said Web host to insert said at least one of said plurality of advertisements into said personal electronic communication.

9. A personal communication system comprising a Web host connected to a wide area network (WAN), said Web host comprising:

a Web server adapted to facilitate the communication of a personal electronic communication between a plurality of network devices via said WAN;

an advertising application operating on said Web host and in communication with said Web server, wherein said advertising application provides the functions of:

providing at least a portion of said plurality of advertisements to one of said plurality of network devices, said plurality of advertisements including a particular advertisement;

receiving a remove command from said one of said plurality of network devices, said command being used by said advertising application to remove said particular advertisement from said plurality of advertisements, thereby creating a palette of advertisements;

receiving communication data and recipient data, said communication and recipient data being used by said advertising application to facilitate the communication of said personal communication between said plurality of network devices, wherein said personal communication comprises an e-mail message;

selecting at least one advertisement, said at least one advertisement being selected using at least a portion of the content of said communication data; and sending said personal communication via said WAN, wherein said personal communication, as viewed by a user, includes said communication data and said at least one advertisement.

10. The personal communication system of claim 9, wherein said advertising application further provides the function of using said at least a portion of the content of said communication data to create said at least one advertisement.

11. The personal communication system of claim 9, wherein said advertising application further provides the function of using said at least one subject matter of said communication data to create said at least one advertisement.

12. A personal communication system comprising a Web host connected to a wide area network (WAN), said Web host comprising:

a Web server adapted to facilitate the communication of a personal communication between a plurality of network devices via said WAN;

a memory device connected to said Web server and adapted to store a plurality of advertisements; and an advertising application operating on said Web host and connected to said memory device, wherein said advertising application provides the functions of:

providing at least a portion of said plurality of advertisements to one of said plurality of network devices, said plurality of advertisements including a first advertisement;

receiving a remove command from said one of said plurality of network devices, said remove command being used by said advertising application to remove said first advertisement from said plurality of advertisements, thereby creating a palette of available advertisements;

receiving communication data and recipient data;

using said communication data and said recipient data to create said personal communication, wherein said personal communication comprises an e-mail message;

selecting at least one advertisement from said palette of available advertisements based on at least a portion of said communication data; and sending said personal communication via said network, wherein said personal communication includes said communication data and said at least one advertisement and is communicated between said plurality of network devices.

13. The personal communication system of claim 12, wherein said at least one of said plurality of network devices is used by a sender of said personal electronic communication.

14. The personal communication system of claim 12, wherein said advertising application further provides the function using at least one subject matter of said communication data to select said at least one of said plurality of advertisements.

15. The personal communication system of claim 12, wherein said advertising application further provides the function of using at least a portion of the content of said communication data to select at least one of said plurality of advertisements.

16. A computer-implemented method for communicating personal information between a plurality of network devices, comprising the steps of:

providing at least a portion of a plurality of advertisements to one of said plurality of network devices, said plurality of advertisements including a particular advertisement;

receiving a command from said one of said plurality of network devices;

using said command to remove said particular advertisement from said plurality of advertisements, thereby creating a palette of advertisements;

receiving communication data and recipient data, wherein said communication data and said recipient data are used at least to send said personal communication to at least one recipient, wherein said personal communication comprises an e-mail message;

automatically selecting by at least one computer at least one advertisement from said palette of advertisements, said at least one advertisement being selected using at least a portion of said communication data;

sending said personal communication to said at least one recipient, wherein said personal communication, as viewed by said at least one recipient, includes said at least one advertisement; and providing said at least one recipient with a free service in exchange for using said Web host to send said personal communication to said at least one recipient.

17. The method of claim 16, further comprising the step of receiving said command from said sender of said personal information.

18. The method of claim 16, further comprising the step of using at least one subject matter of said communication data to automatically select said at least one advertisement.

19. The method of claim 16, further comprising the step of using at least a portion of the content of said communication data to automatically select said at least one advertisement.

* * * * *

UNITED STATES PATENT AND TRADEMARK OFFICE
CERTIFICATE OF CORRECTION

| | |
|---|---|
| PATENT NO. | : 8,645,211 B2 |
| APPLICATION NO. | : 09/755541 |
| DATED | : February 4, 2014 |
| INVENTOR(S) | : Richard A. Rothschild |

It is certified that error appears in the above-identified patent and that said Letters Patent is hereby corrected as shown below:

Item (76), Inventor Anthony R. Rothschild's name is indicated incorrectly at present on the title page of the granted patent document. The correct name should be:

Richard A. Rothschild

Signed and Sealed this
Twenty-ninth Day of April, 2014

Michelle K. Lee
*Deputy Director of the United States Patent and Trademark Office*